(No Model.)
J. H. & P. LUX & S. EDE.
HAY LOADER.
No. 322,836. Patented July 21, 1885.
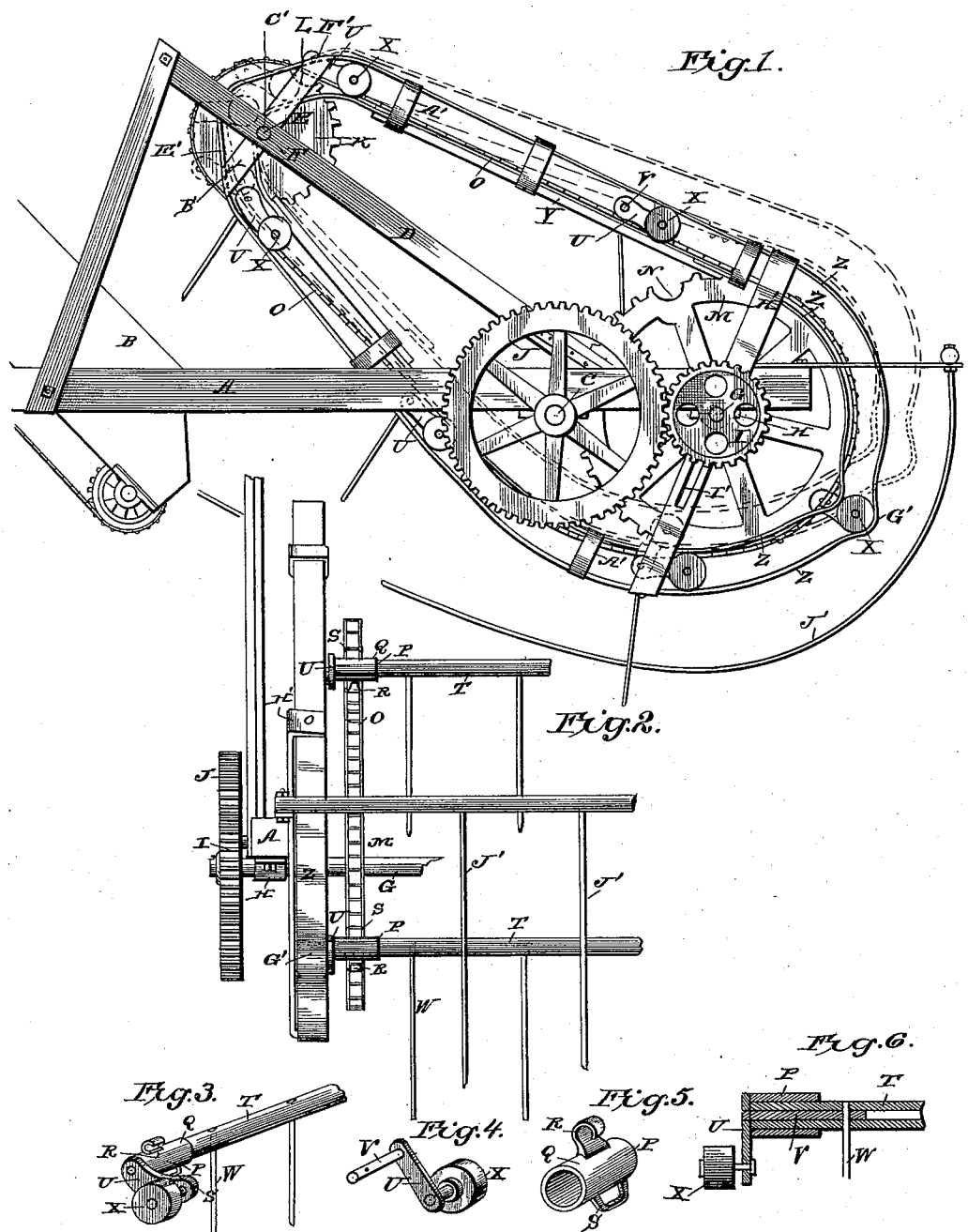
WITNESSES:
Fred. G. Dieterich
Wm Fecher
INVENTOR.
John H. Lux, Philip Lux, & S. Ede.
by Louis Bagger & Co.
ATTORNEYS.

UNITED STATES PATENT OFFICE

JOHN H. LUX, PHILIP LUX, AND SAMUEL EDE, OF EARLVILLE, IOWA.

HAY-LOADER.

SPECIFICATION forming part of Letters Patent No. 322,836, dated July 21, 1885.

Application filed August 18, 1884. (No model.)

*To all whom it may concern:*

Be it known that we, JOHN H. LUX, PHILIP LUX, and SAMUEL EDE, all residents of Earlville, in the county of Delaware and State of Iowa, have invented certain new and useful Improvements in Hay-Loaders; and we do hereby declare that the following is a full, clear, and exact description thereof, which will enable others skilled in the art to which it appertains to make and use the same, reference being had to the accompanying drawings, which form a part of this specification, and in which—

Figure 1 is a side view of as much of a hay-loader as will illustrate our invention, showing in dotted lines the ways raised to throw the rake-teeth out of the way of an obstruction. Fig. 2 is a rear view of the same. Fig. 3 is a perspective view of one end of one of the rake-bars. Fig. 4 is a similar view of one of the tubular links. Fig. 5 is a similar view of one of the cranks at the ends of the tubular rake-bars, and Fig. 6 is a longitudinal sectional view of one end of a rake-bar.

Similar letters of reference indicate corresponding parts in all the figures.

Our invention has relation to that class of hay-loaders in which an endless-chain rake transfers the hay from the ground to an endless elevator-apron; and it consists in the improved construction and combination of parts of such a machine, as hereinafter more fully described and claimed, in which means are provided for guiding the position of the rake-teeth at the several stages of travel of the endless-chain rake.

In the accompanying drawings, the letter A indicates a portion of the frame of the loader, which has the elevator B and drive-axle C, and the side pieces of this frame have the sides D of the rake-frame secured to them.

The upper rake-shaft, E, is journaled in suitable bearings, F, in the upper ends of the sides of the rake-frame, and the lower rake-shaft, G, is journaled in bearings H at the rear ends of the sides of the frame, and is provided with pinions I at its ends, which mesh with cog-wheels J upon the drive-shaft.

The upper rake-shaft is provided with sprocket-wheels K, having recesses L in their peripheries for the reception of the rake-bars, and the lower rake-shaft is provided with sprocket-wheels M, having recesses N in their peripheries for the reception of the rake-bars. Sprocket-chains O pass over these wheels, and are at suitable distances provided with tubular links P, which consist of a tubular body or bearing, Q, and a hook, R, and a bail, S, at diametrically-opposite sides of the body, the said hook and bail being of a construction similar to the hooks and end bars of the chain-links, so as to adapt them to be hooked into the same and form links of the chains. The ends of the round and preferably tubular rake-bars T are journaled in these tubular links, and cranks U are secured with their inwardly-projecting pins V in the ends of the tubular bars, the outermost rake-teeth, W, passing through the bars and through a perforation in the said pins inside of the tubular links, so as to secure the cranks at the ends of the bars.

The outer free ends of the cranks are provided with anti-friction roller X, journaled to project outward from the cranks. The construction of these cranks, and the manner of fastening the same, is shown in Figs. 4 and 5.

The rollers of the cranks travel in guides or tracks Y, which consist of two endless parallel flat strips or bars, Z Z, suitably connected at equal distances from each other by means of braces A', and pivoted at their upper ends upon the upper rake-shaft by means of brackets B', projecting from the inner sides of the tracks and formed with bearings C', in which the rake-shaft revolves.

At the upper end the track is formed with a steep, nearly vertical, portion, E, which at the uppermost end of the track merges into a nearly horizontal portion, F', and the entire upper curved or bent portion of the track is eccentric to the upper rake-shaft, the center of said shaft being somewhat below and at the rear of the center of the bent upper portion of the track. At the lower end the track is formed with a downwardly and rearwardly projecting cam or protuberance, G', the remainder of the said lower portion of the track being concentric with the lower rake-shaft and slightly larger than the sprocket-wheel, following its contour.

The lower segmental portion of the track is provided with a diametrical brace-bar, H', having a longitudinal slot, I', which slides upon the lower rake-shaft, and which extends downward from the middle of the brace-bar so that the rear or lower end of the track may be raised when the rake-teeth are tilted rearward on meeting with obstructions, which will cause the rearwardly-extending cranks to be tilted upward, raising the track, which thus allows the rakes to yield to obstructions on the ground.

It will be seen that as the cranks have their rollers traveling in the lower portion of the track, the cranks will be pointing rearward and downward, keeping the rake-teeth pointing downward and forward, and when the rake-bars arrive at the sprocket-wheels upon the upper rake-shaft the bars will be carried out by the said wheels, forward of the rollers, which travel in the steep portion E', of the track, causing the cranks to occupy a horizontal position, in which position they will enter the horizontal portion of the track and travel downward in the upper portion of the track in advance of the rake-bars until the rollers arrive to the cam or protuberance at the lower end of the track, when the bars again will travel in advance of the rollers, the cranks and rollers thus serving to keep the rake-teeth pointing in the proper direction, so that they will rake the hay, carry it upward to the elevator, and thereupon at the upper portion of their travel slip upward out of the hay, curved bars or strippers J', secured at their upper ends to a cross-piece above the rake and at their lower ends to a cross-piece of the frame, serving to strip the hay from the rake in the same manner as the curved bars or strippers shown in our application No. 135,981, filed on the 25th day of June, 1884. In this manner, it will be seen that the rakes will carry the hay up to the elevator, and that the rake-teeth may be tilted rearward on meeting obstructions, when they will cause the cranks to raise the tracks, which slide with their slotted braces upon the lower rake-shaft, and are pivoted with their bracket-bearings upon the upper rake-shaft.

Having thus described our invention, we claim and desire to secure by Letters Patent of the United States—

1. The combination of the rake-shafts, the rake-bars journaled in tubular links in the said chains and having the cranks provided with anti-friction rollers, and the tracks having the steep portions E' and horizontal portions F' at their upper ends, and having the cams or protuberances G' at their lower ends, as and for the purpose shown and set forth.

2. The combination of the rake-chains having tubular links, the tubular rake-bars, and the cranks at the end of the latter secured in position by rake-teeth driven transversely through the said rake-bars and the inner ends of the cranks, as and for the purpose shown and set forth.

3. In a hay-loader, the combination of the drive-chains having tubular links, the rake-bars journaled in the said links and having cranks provided with anti-friction rollers, and the tracks pivoted upon the upper rake-driving shaft and having slotted braces at their lower ends sliding upon the lower rake-driving shaft, as and for the purpose shown and set forth.

In testimony that we claim the foregoing as our own we have hereunto affixed our signatures in presence of two witnesses.

JOHN H. LUX.
PHILIP LUX.
SAMUEL EDE.

Witnesses:
W. L. GILBERT,
EDWARD WAGNER.